June 12, 1923.
A. E. BUCHENBERG
BATTERY TERMINAL
Filed April 4, 1918
1,458,901
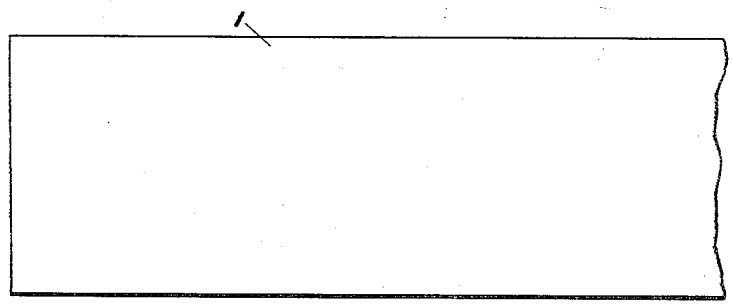
Fig. I.
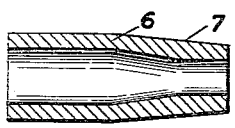 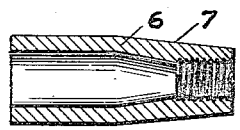
Fig. II.  Fig. III.
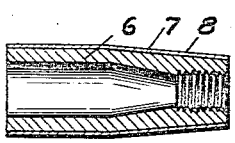 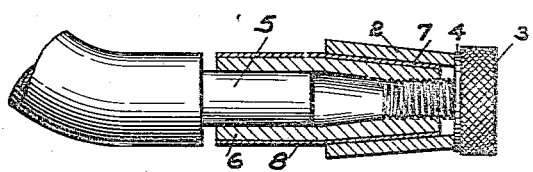
Fig. IV.  Fig. V.
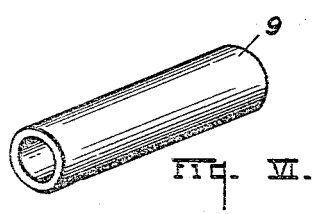 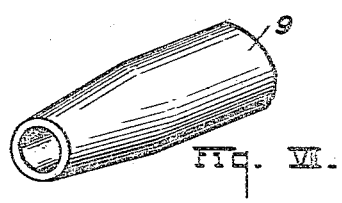
Fig. VI.  Fig. VII.
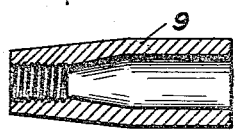
Fig. VIII.
Inventor
Alvin E. Buchenberg
By Chester K Braselton
Attorney Patented June 12, 1923.

1,458,901

UNITED STATES PATENT OFFICE.

ALVIN E. BUCHENBERG, OF TOLEDO, OHIO, ASSIGNOR TO ELECTRIC AUTO-LITE CORPORATION, OF TOLEDO, OHIO, A CORPORATION OF DELAWARE.

BATTERY TERMINAL.

Application filed April 4, 1918. Serial No. 226,659.

*To all whom it may concern:*

Be it known that I, ALVIN E. BUCHENBERG, a citizen of the United States, residing at Toledo, in the county of Lucas and State of Ohio, have invented certain new and useful Improvements in Battery Terminals, of which I declare the following to be a full, clear, and exact description.

This invention relates to battery terminals, and more particularly to the method of making the same.

The principal object of the invention is to perfect a simple and economical method of forming battery terminals by a process eliminating drilling to a large extent.

Another object is to simplify the processes of manufacture of terminals particularly applicable to storage battery uses.

Further objects, and objects relating to economies of manufacture and details of construction, will definitely appear from the detailed description to follow.

I accomplish the objects of my invention by the processes elaborated in the following specification.

Various processes in the manufacture of these terminals are illustrated in the accompanying drawing, forming a part of this specification, in which:—

Fig. I is a plan view of a blank from which the terminals are drawn.

Fig. II shows a section of the terminal as drawn out in an approximately cylindrical form.

Fig. III is similar to Fig. II, showing in addition, the threading at one end.

Fig. IV illustrates the terminal with a thin non-corrodible coating.

Fig. V is a view of the terminal with the connector and battery lead in place.

Fig. VI is a view in perspective of a piece of metal tubing from which the terminal may be drawn.

Fig. VII shows a tubing illustrated in Figure VI with one end drawn out into a taper, and Fig. VIII shows a sectional view of the complete terminal.

In the drawings, similar reference numerals refer to similar parts throughout the several views.

Heretofore, it has been customary to make the terminals for storage batteries of metal castings, very similar to the form shown in Figure V of the drawings, and in which the end of the terminal attachable to the battery lead wire is drilled out to an extent, making it adaptable for the reception of the wire end. Similarly the other end of the terminal was drilled out and threaded for the reception of the attaching screw. This process involves considerable metal wastage, and also the time necessary for the operation and the labor involved, making the process extremely uneconomical.

In the process which I have evolved, I employ a metal strip 1, preferably of copper or a similar easily workable and highly conductive metal, and by means of a drawing press, draw out the metal into approximately cylindrical tubes 6 to a desired length. Various mechanical methods might be employed in drawing out the metal into its proper shape for the purpose described but preferably a die is used in connection with a power press having a reciprocating tool adapted to force the metal, which is originally in strip form, into the die and bring it into the same conformation as the die, without ordinarily the employment of a heating process, although in some cases the utilization of a heating process is advantageous. After the metal has been forced into the general form of the tube the metal strip is removed from the die and the extended tips of the projections cut off and the tubes removed from the strip, thus permitting access at both ends through the tube. One end of the terminal is then compressed slightly into a tapered formation 7, as shown in Fig. II, or brought into this shape by the drawing process, the object of attaining this particular shape being fully explained hereafter. The tapered end of the terminal is now tapped to a desired diameter, as in Fig. III, when it is ready for assemblage in the complete connecting unit.

Ordinarily, this terminal is preferably employed for storage batteries where the presence of corrosive acids makes it desirable that some coating 8 be added to the terminal which will prevent deleterious chemical action upon it. With this object in consideration, the terminal is immersed in a lead bath, or lead is employed in any other suitable fashion, either before or after the tapered end has been threaded, when it takes the form as illustrated in Figure IV.

A tapered ring 2, having an inclination similar to that of the terminal tapered portion, is employed in the complete unit, this ring being held in position upon the terminal by a thumb screw 3. The purpose of the ring tube is not only to increase the electrical conductivity between the terminal of the battery and combining screw 3, but also to prevent the ingress of corrosive gases which would tend to make the operation of the screw 3, difficult. The metallic washer 4 is interposed between the ring and the head of the thumb screw, the object of which is to prevent ingress of oils and dust particles, and to facilitate connection with electrical apparatus by forming one side of the electrical contact.

The purpose of the taper in the terminal now becomes apparent, in that it serves as a connecting contact for the thumb screw, and permits utilization of a larger bearing area than would otherwise be possible. In addition, the screw action of the thumb screws tends to force the ring into closer contact with the terminal, thereby increasing electrical conductivity therebetween. The lead wire end 5 is held in the larger end of the terminal by means of solder, or merely by friction.

I have illustrated a modified process of forming my terminal, which consists in utilizing a metal tube 9 of approximate length, as in Fig. VI, drawing one end of it out into proper tapered formation, the threading of the terminal, and the coating of the same with lead being carried on as in my preferred method.

I am aware that the methods I have herein disclosed are susceptible of variation in detail, without departing from the spirit of my invention, and I therefore desire to claim the same broadly, as well as specifically, as indicated in the appended claim.

Having thus described my invention, what I claim as new and desire to secure by Letters Patent, is:

An article of manufacture comprising a tube, one end portion of which is adapted to receive a conductor, the other end portion of which is tapered on its exterior adapting it to fit into a tapered socket and internally screw threaded for the reception of a binding screw.

In testimony whereof, I affix my signature.

ALVIN E. BUCHENBERG.